United States Patent [19]

Cosway

[11] 4,398,506
[45] Aug. 16, 1983

[54] SYSTEM FOR IMPROVING COMBUSTION EFFICIENCY

[76] Inventor: Thomas M. Cosway, 124 Caroline St., South Yarra, Victoria 3141, Australia

[21] Appl. No.: 235,976

[22] Filed: Feb. 19, 1981

[30] Foreign Application Priority Data

Feb. 21, 1980 [AU] Australia .............................. PE2472

[51] Int. Cl.³ ............................................. F02D 19/00
[52] U.S. Cl. ................................ 123/25 L; 123/25 R; 123/25 A
[58] Field of Search ................. 123/25 A, 25 R, 25 L, 123/25 E, 1 A, 198 A

[56] References Cited

U.S. PATENT DOCUMENTS

| | | | |
|---|---|---|---|
| 2,431,679 | 12/1947 | Adair | 123/25 L |
| 2,537,495 | 1/1951 | Wallin | 123/25 R |
| 2,580,013 | 12/1951 | Gazda | 123/25 A |
| 2,632,637 | 3/1953 | Stone | 261/65 |
| 2,843,216 | 7/1958 | Powell | 123/25 A |
| 3,044,453 | 7/1962 | Hoffman | 123/25 B |
| 3,050,044 | 8/1962 | Anderson | 123/25 R |
| 3,834,360 | 9/1974 | Blitch | 123/25 A |
| 3,865,907 | 2/1975 | Rock | 123/25 L |
| 3,866,579 | 2/1975 | Sennuys | 123/25 A |
| 3,880,124 | 4/1975 | Stratton | 123/25 A |
| 3,991,724 | 11/1976 | Geiser | 123/25 A |
| 4,068,625 | 1/1978 | Brown | 123/25 A |
| 4,076,002 | 2/1978 | Mellquist et al. | 123/25 R |
| 4,078,527 | 3/1978 | Yasuda | 123/25 L |
| 4,166,435 | 9/1979 | Kiang | 123/25 A |
| 4,306,519 | 12/1957 | Schoenhard | 123/25 E |

Primary Examiner—Ira S. Lazarus
Attorney, Agent, or Firm—Cushman, Darby & Cushman

[57] ABSTRACT

A system for improving the combustion efficiency of an internal combustion engine having means for supply fuel and primary air for combustion in said engine and a valve for controlling the flow of at least the primary air into the engine, said system including means for introducing liquid in fine particle or vapour form into the primary air stream and means for drawing air treated by said liquid introducing means into the primary air stream at a position immediately down stream of the primary air controlling valve of the engine together with valve means for controlling the flow of said treated air in response to the level of vacuum produced by said engine whereby the valve means is closed when the engine is idling and is open when the engine is operating at a speed above the idling speed. The valve means is positioned in a line connected to the primary air stream and to a source of the treated air, said valve means being spring loaded to close said line when said engine is operating at idling speed, said valve means being opened by the suction is said line at speeds above the idling speed.

The liquid introducing means comprises an air and liquid permeable member in the form of an element of open-pore cellular material having a pore density which facilitates proper air flow through the adequate saturation of said element together with means for introducing liquid into the element and for constraining the air flow through the element to ensure that the air collects an adequate amount of liquid in fine particle or vapour form.

8 Claims, 4 Drawing Figures

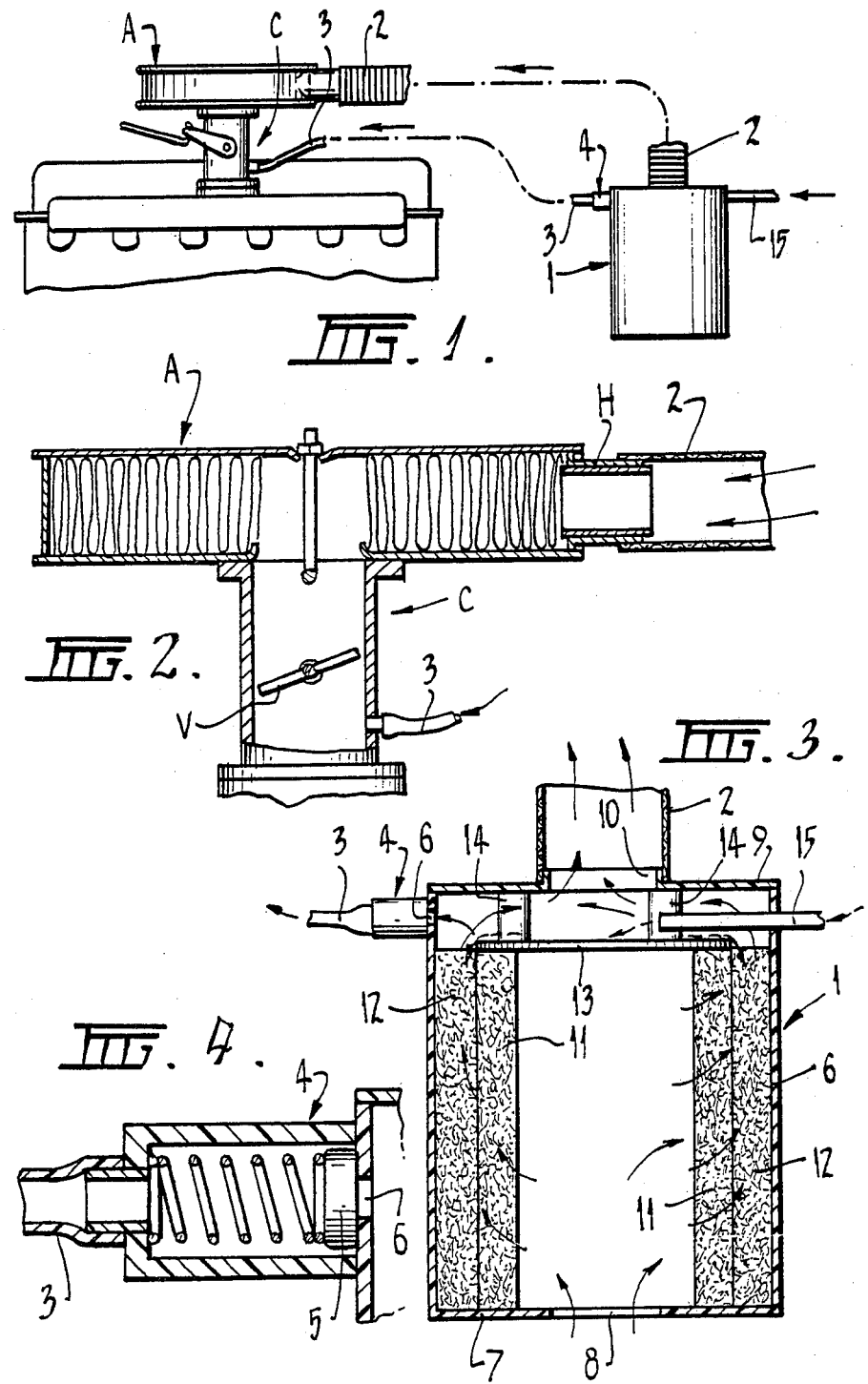

SYSTEM FOR IMPROVING COMBUSTION EFFICIENCY

This invention relates to an improved system for improving combustion efficiency in internal combustion engines. More particularly, the invention relates to a system for introducing controlled quantities of water into the combustion process of internal combustion engines.

Australian Pat. No. 450,882 describes an improved device for introducing controlled quantities of water into the carburettor of an internal combustion engine. While this device was used with some success to improve combustion efficiency, resulting in reduced fuel comsumption and lower levels of pollutants in the exhaust gases, it was often necessary to replace the main fuel jet of the carburettor by a smaller jet. This is undesirable since it complicates the fitting of the device to the engine.

It is an object of the present invention to provide a system which avoids the disadvantage referred to above and which nevertheless results in the controlled introduction of water into the combustion process.

The invention therefore provides a system for improving the combustion efficiency of an internal combustion engine having means supplying fuel and primary air for combustion in said engine and a valve for controlling the flow of at least said primary air into said engine, said system including means for introducing a liquid in fine particle or vapour form into said primary air stream, means for drawing air treated by said liquid introducing means into said primary air stream at a position down stream of the primary air controlling valve of said engine, and valve means for controlling the flow of said treated air in response to the level of vacuum produced by said engine whereby said valve means is closed when the engine is idling and is open when the engine is operating at a speed above the idling speed.

The valve means is preferably positioned in a line connected to said primary air stream and to a source of treated air, said valve means being opened by the suction in said line caused by the connection of said line to said primary air stream at a position downstream of the primary air controlling valve of said engine.

The treated air is preferably introduced into said primary air stream immediately downstream of the primary air controlling valve to ensure that the response time to the change in vacuum caused by opening of the valve from the idling position in minimal.

The liquid introducing means preferably comprises as air and liquid permeable member in the form of an element of open-pore cellular material constituted by interconnecting strands of material free from covering membranes, said member having a pore density which facilitates proper air flow through and adequate saturation of said element, and means for introducing liquid into said element for saturating said element with liquid to a predetermined level such that the liquid is entrained into said air stream in fine particle or vapour form.

In a particularly preferred form of the invention, the liquid introducing means comprises a housing having an air inlet opening and an air outlet opening, means for constraining the air to flow transversely through one part or element of said open-pore material, and means for constraining said air to flow longitudinally through another element or portion of said open-pore material to said air outlet whereby said air collects an adequate amount of liquid in fine particle or vapour form.

The air path between said liquid introducing means and said engine preferably includes means for restricting the flow of air therethrough to reduce the level of vacuum produced by the engine. In one preferred form, the flow of air is restricted by a tube positioned in said air path to reduce the size of said air path.

One particularly preferred form of the invention will now be described with reference to the accompanying drawings in which;

FIG. 1 is a schematic elevation of an internal combustion engine to which a system embodying the invention has been fitted;

FIG. 2 is a section elevation of the carburettor and air cleaner of the engine of FIG. 1;

FIG. 3 is a sectional elevation of the liquid introducing means shown in FIG. 1, and FIG. 4 is a sectional elevation of the control valve shown in FIG. 1.

In general terms, the system shown in FIG. 1 of the drawings comprises a liquid introducing device 1 coupled to the carburettor C of the internal combustion engine by means of a flexible tube 2 connected to the air horn H of the air cleaner A which contains an air filter element E. An airflow restricting tube T is preferably positioned within the air horn H of the air cleaner A to restrict the air flow to the carburettor C to thereby reduce the level of vacuum produced by the engine. In the case of some engines, a restriction is not required.

An air bleed line 3 is connected to a fitting opening into the carburettor C below the butterfly valve V thereof and to the liquid introducing device 1. The air bleed line 3 includes a valve 3 comprising a valve member 5 (FIG. 4) which is spring loaded to normally close an opening 6 into the device 1 when the engine is idling. The valve member 5 is drawn away from the opening 6 by the vacuum in the line 3 at engine speeds above idling speed to draw moist air from device 1.

The liquid introducing device 1 comprises and generally cylindrical housing 6 closed at one end by a bottom wall 7 having an air inlet opening 8 therein and closed at the other end by a top wall 9 having a flanged air outlet opening 10 over which the air passage tube 2 is connected. The housing 6 receives two annular air and liquid permeable elements 11 and 12 of open-pore cellular material such as "Esta-Foam". The use of two elements in the above manner effectively restricts the pore size of the combined elements due to overlap between the interconnecting strands of material defining the cellular structures in the two elements to ensure good admixture of air and liquid as discussed in greater detail below.

The upper end of the innermost element 11 is sealed off by a circular plate 13 which is attached in spaced relation to the top wall 9 by spacer elements 14. This sealing of the end of the innermost element 11 causes the air passing through the element 11 to travel generally transversally whereupon it travels longitudinally up the outer element 12.

Liquid is introduced to the housing 6 by means of an inlet pipe 15 disposed in the space between the plate 13 and the top wall 9 to deliver liquid onto the top of the plate 13 from which it permeates down the element 12 and into the element 11. Liquid is supplied to the inlet pipe 15 by means of a suitable pump (not shown), such as a modified windscreen washer pump which is controlled to deliver the required volume of liquid into the housing 6 to maintain the desired moisture level within the elements 11 and 12. It has been found that by pumping about 4 ml of water to the elements 11 and 12 approximately every 2 minutes, the required moisture level is maintained for a system suitable for a vehicle of the type discussed in further detail below.

As mentioned above, the air entering the housing 6 through the opening 8 travels substantially transversely through the element 11 since it cannot reach the air outlet 10 because of the plate 13. The air then travels longitudinally through the element 12 until it reaches the air outlet 10 passing through the space between the plate 13 and the end wall 9. By this arrangement, the air and liquid are thoroughly admixed and the liquid is entrained into the air stream in vapour or fine particle form.

The use of the system embodying the invention substantially improves the efficiency of combustion within the engine, thereby decreasing fuel consumption and reducing the pollution content of the exhaust gases. The system embodying the invention was fitted to a Holden Kingswood 173 using standard octane fuel and fuel consumption readings of approximately 33 miles per gallon at a cruise speed of 50 miles per hour were obtained. Under all test conditions, the carbon monoxide content in the exhaust gases was under 1% using a "Sun" carbon monoxide tester. Without the system embodying the invention, fuel consumption at the same cruise speed was about 26 miles per gallon and carbon monoxide readings of between 4% to 6% were recorded.

It will be noted from these results that Co emissions are acceptably low for a vehicle having no fitted pollution controls. Similarly a significant increase in the fuel economy expected from a vehicle of this type was produced by the use of a system embodying the invention without any noticable loss in power output.

It is believed that the system embodying the invention may be used with equal effect on an engine having a higher compression ratio and that the use of the system will enable the burning of low octane fuel and lead-free fuels without any significant loss in power. In the above tests, the engine performed well without pinging under load and it is believed that similar results should be obtainable in the case of a high compression ratio engine. Similarly, the system may be used with equal effect on engines having fuel injection systems although the size of the air outlet opening 8 may need to be enlarged. Where the engine has pollution controls fitted, it may be desirable to cool and condense the recycled exhaust gases so that excess liquid may be removed.

Where it is not practical to fit the tube 2 to the air horn H, a hole may be made in the air cleaner and the tube 2 fitted directly to the venturi throat of the carburettor.

What I claim is:

1. A system for improving the combustion efficiency of an internal combustion engine having means supplying fuel and primary air for combustion in said engine and a valve for controlling the flow of at least said primary air into said engine, said system including means for introducing a liquid in fine particle or vapour form into said primary air stream, means for drawing air treated by said liquid introducing means into said primary air stream at a position down stream of the primary air controlling valve of said engine, and valve means for controlling the flow of said treated air in response to the level of vacuum produced by said engine whereby said valve means is closed when the engine is idling and is open when the engine is operating at a speed above the idling speed.

2. A system of claim 1, wherein said treated air is introduced into said primary air stream immediately downstream of said air controlling valve.

3. The system of claim 1 or 2, hwerein said valve means is positioned in a line which opens into said primary air stream at a position down stream of the primary air controlling valve of said engine and to a source of said treated air, said valve means being opened by the suction in said line.

4. The system of claim 1, 2 or 3, wherein said liquid introducing means includes an air and liquid permeable member in the form of an element of open-pore cellular material constituted by interconnecting strands of material fre from covering membrances, said member having a pore density which facilitates proper air flow through and adequate saturation of said element, and means for introducing liquid into said element for saturating said element with liquid to a predetermined level such that the liquid is entrained into said air stream in fine particle or vapour form.

5. The system of claim 4, wherein the said element is positioned within a housing having an air inlet opening and an air outlet opening, means for constraining the air to flow generally transversaly through one part of said element and for enabling said air to flow longitudinally through another part of said element to said air outlet whereby said air collects an adequate amount of liquid in fine particle or vapour form.

6. The system of claim 5, wherein the said element comprises two annular portions of said open-pore cellular material one arranged within and in contact with the other, said constraining means comprising means for sealing one end of the innermost portion of said element against longitudinal air flow whilst leaving the outermost portion of said element open to said outlet opening.

7. The system of any one of the preceeding claims, further comprising means for restricting the flow or air from said liquid introducing means to said primary air stream to reduce the level of vacuum produced by the engine.

8. The system of claim 7, wherein said restricting means comprises a tube positioned in the airpath the reduce the size of said airpath.

* * * * *